United States Patent
Song

(10) Patent No.: US 12,099,145 B2
(45) Date of Patent: Sep. 24, 2024

(54) SPAD ARRAY WITH AMBIENT LIGHT SUPPRESSION FOR SOLID-STATE LIDAR

(71) Applicant: Liturex (Guangzhou) Co. Ltd, Guangzhou (CN)

(72) Inventor: Yunpeng Song, San Ramon, CA (US)

(73) Assignee: Liturex (Guangzhou) Co. Ltd., Guangzhou (CN)

(*) Notice: Subject to any disclaimer, the term of this patent is extended or adjusted under 35 U.S.C. 154(b) by 933 days.

(21) Appl. No.: 17/144,115

(22) Filed: Jan. 7, 2021

(65) Prior Publication Data

US 2021/0208257 A1 Jul. 8, 2021

Related U.S. Application Data

(60) Provisional application No. 62/958,239, filed on Jan. 7, 2020.

(51) Int. Cl.
| | |
|---|---|
| G01S 7/48 | (2006.01) |
| G01S 7/481 | (2006.01) |
| G01S 7/4863 | (2020.01) |
| G01S 17/10 | (2020.01) |

(52) U.S. Cl.
CPC .......... *G01S 7/4863* (2013.01); *G01S 7/4817* (2013.01); *G01S 17/10* (2013.01)

(58) Field of Classification Search
USPC ....................................................... 356/4.01
See application file for complete search history.

(56) References Cited

U.S. PATENT DOCUMENTS

| | | | | |
|---|---|---|---|---|
| 2002/0087933 A1* | 7/2002 | Matsuura | ............. | H04N 19/126 |
| | | | | 375/E7.14 |
| 2012/0326049 A1* | 12/2012 | Hannemann | ............ | G01T 1/243 |
| | | | | 250/394 |
| 2020/0284883 A1* | 9/2020 | Ferreira | ................ | G01S 7/4816 |
| 2020/0348416 A1* | 11/2020 | Sakaguchi | ............. | G01S 17/10 |
| 2021/0063240 A1* | 3/2021 | Mellot | .................. | G01S 17/894 |

FOREIGN PATENT DOCUMENTS

| | | | | | |
|---|---|---|---|---|---|
| JP | 2020091117 A | * | 6/2020 | ............. | G01S 17/10 |
| WO | WO-2019121437 A1 | * | 6/2019 | ............. | G01S 17/10 |
| WO | WO-2020116039 A1 | * | 6/2020 | ............. | G01S 17/10 |
| WO | WO-2021117359 A1 | * | 6/2021 | ........... | G01S 7/4863 |

* cited by examiner

*Primary Examiner* — James R Hulka
(74) *Attorney, Agent, or Firm* — Davis Wright Tremaine LLP

(57) ABSTRACT

In various embodiments, described herein are systems and methods for ambient light suppression on a photodetector of a LiDAR device. The LiDAR device can be configured to scan laser pulses in such a manner that reflected laser pulses are incident on one column of macro-pixels at a time in a macro-pixel array on the photodetector, where only that column is turned on, and the rest of the columns are turned off. The LiDAR device can further be configured to scan at different angles such that laser pulses from a same portion of a target object can be incident on the turned-on column multiple times to increase the resolution of a LiDAR image. Further, outputs from multiple SPADs in a max-pixel are concatenated to form a multi-level digital signal, and a threshold can be used for discarding or registering the multi-level digital signal for further noise reduction.

20 Claims, 5 Drawing Sheets

SPAD ARRAY WITH AMBIENT LIGHT SUPPRESSION FOR SOLID-STATE LIDAR

CLAIM OF PRIORITY

This application claims the benefit of priority to U.S. Provisional Application No. 62/958,239, titled "SPAD Array with Ambient Light Suppression for Solid-State LiDAR", filed Jan. 7, 2020, which application is herein incorporated by reference in its entirety.

TECHNICAL FIELD

Embodiments of the present invention relate generally to remote sensing, and more particularly relate to a method of ambient light suppression by selectively turning off portions of a photodetector, and using a multi-level digital signal for signal triggering.

BACKGROUND

A LiDAR device can measure distances to objects in an environment by illuminating the objects with laser pulses and measuring reflected pulses from the objects. LiDAR devices typically utilizes high-grade optics and a rotating assembly to create a wide field of view, but such implementation tends to be bulky and costly. Solid-state Lidar sensors tend to be less costly but still may have large dimensions.

Solid State LiDAR devices tend to use single photon avalanche diodes (SPAD), which has high photon sensitivity. However, SPADs are also prone to ambient light. Traditionally, histogram binning can be used to remove ambient light can improve signal to noise rations, but may need a large number of illuminations to generate a usable histogram. Thus the approach is energy inefficient.

SUMMARY

In various embodiments, described herein are systems and methods for ambient light suppression on a photodetector of a LiDAR device. The LiDAR device can be configured to scan laser pulses in such a manner that reflected laser pulses are incident on one column of macro-pixels at a time in a macro-pixel array on the photodetector, where only that column is turned on, and the rest of the columns are turned off. The LiDAR device can further be configured to scan at different angles such that laser pulses from a same portion of a target object can be incident on the turned-on column multiple times to increase the resolution of a LiDAR image. Further, outputs from multiple SPADs in a max-pixel are concatenated to form a multi-level digital signal, and a threshold can be used for discarding or registering the multi-level digital signal for further noise reduction.

BRIEF DESCRIPTION OF THE DRAWINGS

Embodiments of the disclosure are illustrated by way of example and not limitation in the figures of the accompanying drawings, in which like references indicate similar elements.

DETAILED DESCRIPTION

Figure 1:
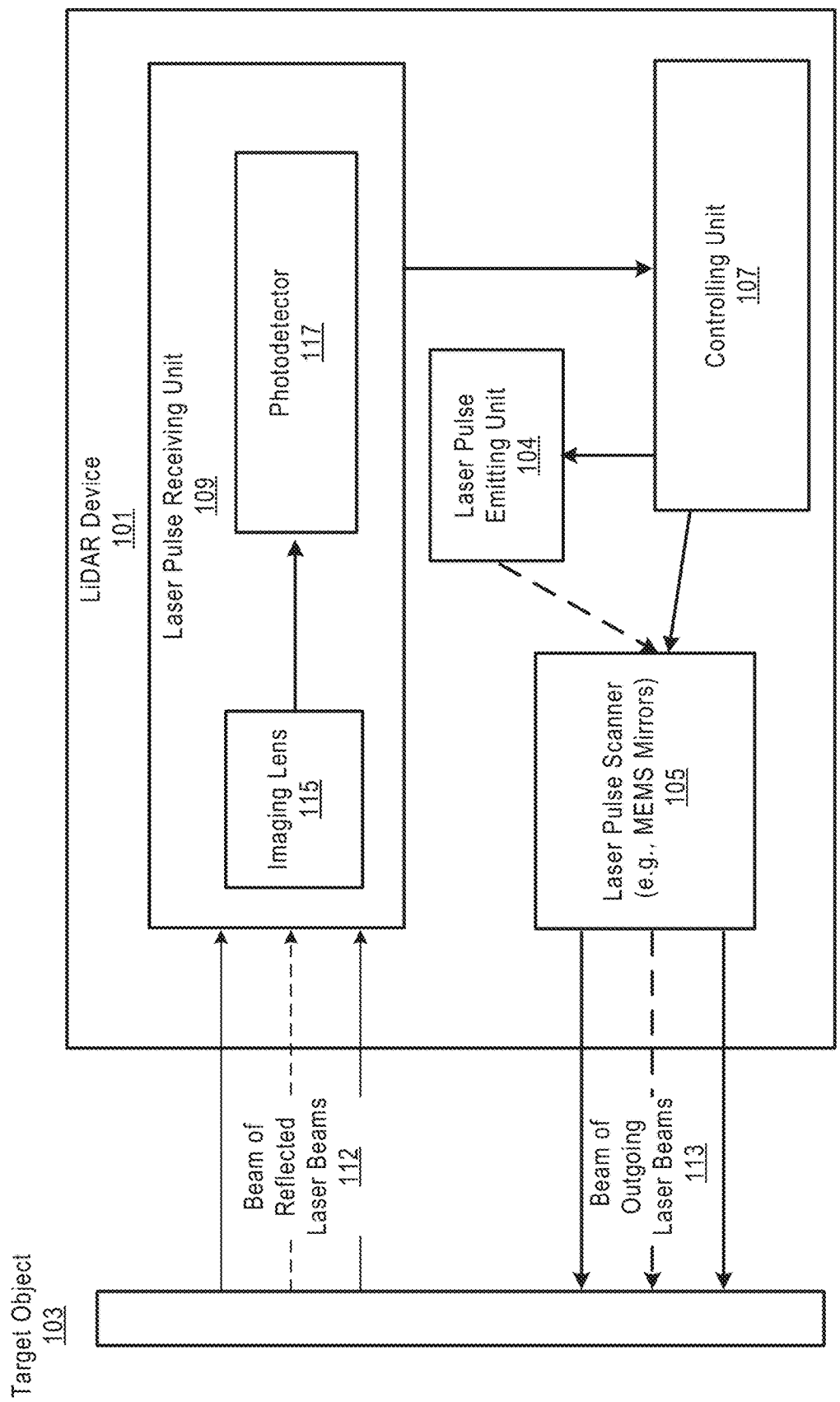
FIG. 1 illustrates an example LiDAR device in which embodiments of the invention can be implemented in accordance with an embodiment.

The following description and drawings are illustrative and are not to be construed as limiting. Numerous specific details are described to provide a thorough understanding of various embodiments. However, in certain instances, well-known or conventional details are not described in order to provide a concise discussion of the embodiments.

In various embodiments, described herein are systems and methods for ambient light suppression on a photodetector of a LiDAR device. The LiDAR device can be configured to scan laser pulses in such a manner that reflected laser pulses are incident on one column of macro-pixels at a time in a macro-pixel array on the photodetector, where only that column is turned on, and the rest of the columns are turned off. The LiDAR device can further be configured to scan at different angles such that laser pulses from a same portion of a target object can be incident on the turned-on column multiple times to increase the resolution of a LiDAR image. Further, outputs from multiple SPADs in a max-pixel are concatenated to form a multi-level digital signal, and a threshold can be used for discarding or registering the multi-level digital signal for further noise reduction.

In one embodiment, a system for suppressing ambient light in a light detection and ranging (LiDAR) device comprises a photodetector including a plurality of macro-pixels forming a macro-pixel array, each macro-pixel in the photodetector including a number of single photon avalanche diodes (SPAD); a laser scanner to scan laser beams at different directions; and a controlling unit that configures the laser scanner to scan laser beams such that reflected laser photons are incident on the photodetector one column of macro-pixels at a time, the column of macro-pixels being turned on, and the rest of the macro-pixels on the photodetector being turned off.

In one embodiment, the system further comprises a number of adders, each adder configured to read photons from one macro-pixel of the turned-on column of macro-pixels, and construct a multi-level digital signal. The photons read from the macro-pixel include one or more signal photons and one or more noise photons. The controlling unit is further configured to register the multi-level digital signal based on a predetermined threshold.

In one embodiment, the laser scanner is configured to scan for a predetermined number of times, each time at a different angle, such that the turned-on column of macro-pixels receives reflected laser pulses of a same portion of a target object from different angles. The laser scanner is configured to scan for a predetermined number of times, each time at a same angle, such that the turned-on column of macro-pixels receives reflected laser pulses of a same portion of a target object from the same angle. The controlling unit is configured to read photons from the turned-on column of macro-pixels by using adders to construct multi-level digital signals or without.

In one embodiment, the laser beams are linear laser beams that are either diffused from laser spots by a diffuser in the LiDAR device, or directly generated by a laser pulse emitting unit in the LiDAR device.

The embodiments can above be practiced as methods, and can include non-transitory machine readable media that store executable computer program instructions that can cause one or more data processing systems to perform the one or more methods described herein when the computer program instructions are executed by the one or more data processing systems. The instructions can be stored in non-volatile memory such as flash memory or other forms of memory.

A sequence of the operations of a method in the embodiments of the present invention may be adjusted, and certain operations may also be combined or removed according to an actual requirement.

The above summary does not include an exhaustive list of all embodiments in this disclosure. All systems and methods can be practiced from all suitable combinations of the various aspects and embodiments described in the disclosure.

Solid State LiDAR Device

FIG. 1 illustrates an example of a LiDAR device 101 in which embodiments of the invention can be implemented in accordance with an embodiment.

The LiDAR device 101 can be a solid state LiDAR device 101, which can measure distances to objects in an environment by illuminating the objects with laser pulses (laser beams). Differences in return times of the reflected laser pulses and wavelengths can be used to create a point cloud of the environment. The point cloud can provide spatial location and depth information, for use in identifying and tracking the objects.

As shown in FIG. 1, the LiDAR device 101 can include a laser pulse emitting unit 104, a laser pulse scanner 105, a laser pulse receiving unit 109, and a controlling unit 107. The laser pulse emitting unit 104 can include one or more laser emitters that emit beams of short pulses of laser light including photons of various frequencies. The laser pulse emitting unit can emit laser spots or linear laser beams. In some embodiment, a diffuser can be used to increase the size of laser spots, including changing the shape of the laser spots into desired laser beams.

In one embodiment, the laser pulse emitting unit 104 can project linear laser beams. In this embodiment, the laser pulse emitting unit 104 uses a number of fast axis collimators (FACs) to collimate laser beams from a laser source array, a cylinder lens array for converting the collimated laser beams to parallel laser beams, and a prism array pair for reducing the pitch of the parallel laser beams. The laser pulse emitting unit 104 can further includes a first cylinder lens for focusing the laser beams from the prism array pair onto a MEMS mirror, which redirects the laser beams as a linear laser beam towards a predetermined direction.

For example, in FIG. 1, the laser pulse emitting unit 104 emits outgoing laser beams 113. The beam of outgoing laser beams 113 can be steered or scanned by the laser pulse scanner 105 in one or more directions using a variety of mechanisms, including microelectromechanical system (MEMS) mirrors, and one or more optical phased arrays (OPA). Each of the one or more directions is referred to as a steering direction or a scanning direction. A vertical angle and a horizontal angle associated with each steering direction is referred to as a steering angle or a scanning angle respectively. The laser pulse scanner 105 can steer one or more beams of laser pulses in a steering direction. Each beam of laser pulses can have a fixed number of pulses.

The controlling unit 107 can include control logic implemented in hardware, software, firmware, or a combination thereof. The controlling logic 107 can drive the other units or subsystems 104, 105 and 109 of the LiDAR device 101 in a coordinated manner, and can execute one or more data processing algorithms to perform one or more operations for signal filtering, object detections, and image processing. For example, the controlling unit 107 can synchronize the laser pulse emitting unit 104 and the laser pulse scanner 105 so that the scanner pulse scanner 105 can scan a horizontal field of view in multiple lines or at a particular direction.

The laser light receiving unit 109 can collect one or more beams of laser beams (e.g., laser beams 112) reflected from a target object 103 using one or more imaging lens (e.g., imaging lens 115), and focus the beams of laser pulses a photodetector 117, which can include multiple high-sensitivity photodiodes. The photodetectors can convert photons in the reflected laser pulses into electricity, and send returned signals incident on the photodetector 117 to the controlling unit 107 for processing.

In one embodiment, laser diodes in the laser pulse emitting unit 104 can operate in a pulsed mode with a pulse repeating at a fixed interval (e.g., every few micro-seconds). The laser diodes and laser drive circuits for providing appropriate bias and modulation currents for the laser diodes can be chosen according to predetermined performance parameters of the LiDAR device 101. Examples of the performance parameters can include a required maximum range of scanned space and resolution.

Ambient Light Suppression

Figure 2:
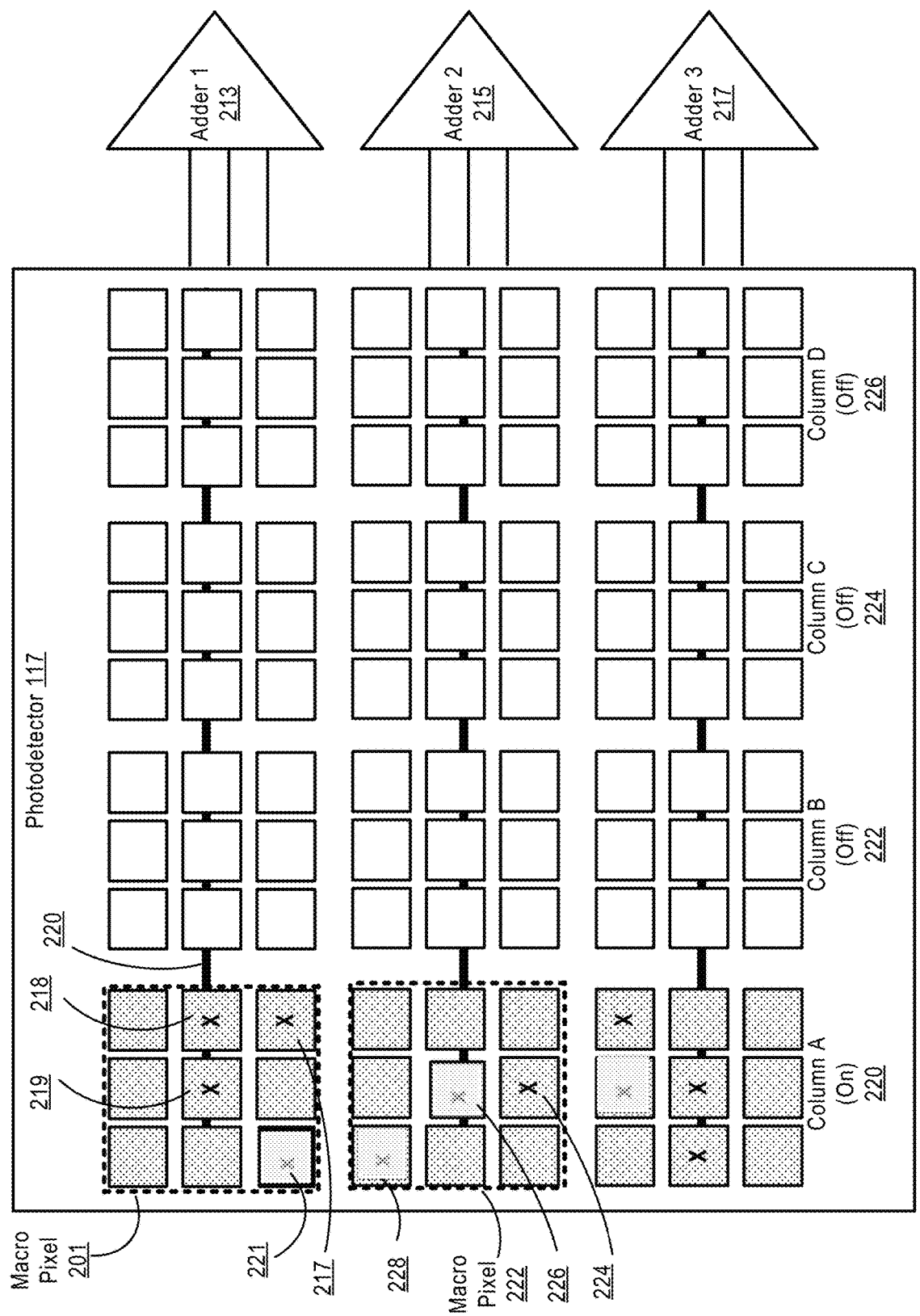
FIG. 2 shows a system for suppressing ambient light on a LiDAR photodetector in accordance with an embodiment.

FIG. 2 shows a system for suppressing ambient light on a LiDAR photodetector in accordance with an embodiment.

As shown in FIG. 2, the photodetector 117 includes multiple macro-pixels, which form a macro-pixel array. As used herein and in the provisional application to which this disclosure claims priority, a macro-pixel is also referred to as a max pixel.

In FIG. 2, the macro-pixel array can include 12 macro-pixels, with each macro-pixel including 9 SPADs. The 12 macro-pixels are arranged in 3 rows of macro-pixels and 4 columns of macro-pixels 220, 222, 224, and 225. Macro-pixels in each row is connected by a bus, with an adder attached to the bus.

For example, adder 1 213 is attached to a bus 220 connecting the first row of macro-pixels, adder B 215 is attached to a bus connecting the second row of macro-pixels, and adder C is attached to a bus connecting the third row of macro-pixels. All the macro-pixels in the photodetector 117 can be connected together through the different buses or the adders.

The laser pulse scanner unit 105 of the LiDAR device 101 can be configured by the controlling unit 107 to scan laser pulses in such a manner that reflected laser pulses from a target object are incident on the macro-pixel array one column at a time from left to right column. For example, the reflected laser pulses can be incident on column A 220 first, then on column B 222, followed by column C 224 and column D 226.

The controlling unit 107 can dynamically turn on and turn off each column of macro-pixels, depending on which column is to receive reflected pulses. In one embodiment, the controlling unit 107 can turn on only that column of macro pixels that is to receive reflected laser pulses; and turn off the other columns of macro pixels on the photodetectors 117.

By dynamically turning on and turning off the columns of macro-pixels, the signal to noise ratio of the LiDAR device 101 can be improved, since the turned-off macro pixels cannot receive any photons, including ambient photons. The turned-off macro-pixels are not expected to receive any photons due to the reflection from the illumination in the particular scan shown in FIG. 2. Therefore, any photons incident on those macro-pixels would be noises had they not been turned off.

FIG. 2 shows that column A 220 of macro pixels is turned on and is receiving reflected signals. Therefore, only column A 220 is turned on, and the rest of the columns (columns 222, 224, and 226) are turned off. However, in another point of time, when column B 222 is receiving reflected laser signals from a corresponding scanning angle, column A 220 would be turned off, and column C 224 and column D 226 will remain off. In the whole photodetector, only column B 222 would be on.

As further shown in FIG. 2, each macro pixel can receive one or more photons representing real signals reflected from the target object, and one or more noise photons. For example, a macro pixel 201 can receive signal photons 217, 218 and 219; and one noise photon 221 from ambient light. The controlling unit 107 or adder 1 213 can convert all the photons 217, 218, 219 and 221 that are incident on the macro-pixel 201 into electrical signal. Since the photons 217, 218, 219 and 221 could arrive at a slightly different time, the output of adder 1 213 is a multi-level digital signal. In the embodiment as shown in FIG. 2, a four-level digital signal would be constructed from the four photons, including the noise photon 217, that are received on the macro-pixel 201.

In one embodiment, the controlling unit 107 can apply a predetermined threshold value to the four-level digital signal. The threshold value can be used to determine whether to register the four-level digital signal as a signal event or discard it as a noise event.

For example, the threshold value can be set 3.5. Therefore, the controlling unit 107 can register the four-level digital signal as a signal event because the number of levels representing the number of photons is equal to or more than the threshold value.

Another macro-pixel 222 can receive two noise photons 226 and 228 from ambient light, and one signal photon 224. A three-level digital event constructed by the controlling unit 107 from the macro-pixel 222 would be rejected as a noise event because the multi-level digital event does not reach the threshold of 3.5.

In an alternatively embodiment, the controlling unit 107 is configured to read photons from the turned-on column of macro-pixels without using adders 213, 215 and 217 to construct multi-level digital signals.

Figure 3A:
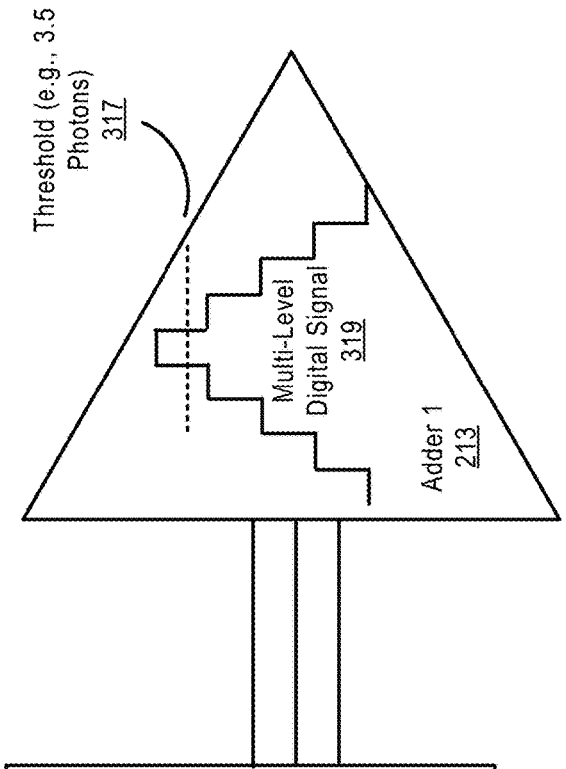
FIGS. 3A-3B illustrate examples of a multi-level digital signal and an example of a threshold value in accordance with an embodiment.
Figure 3A:
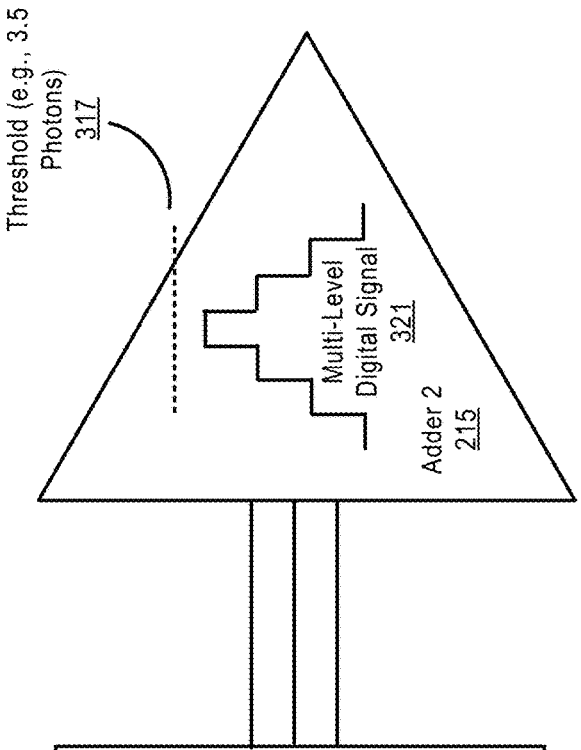
Figure 3B:
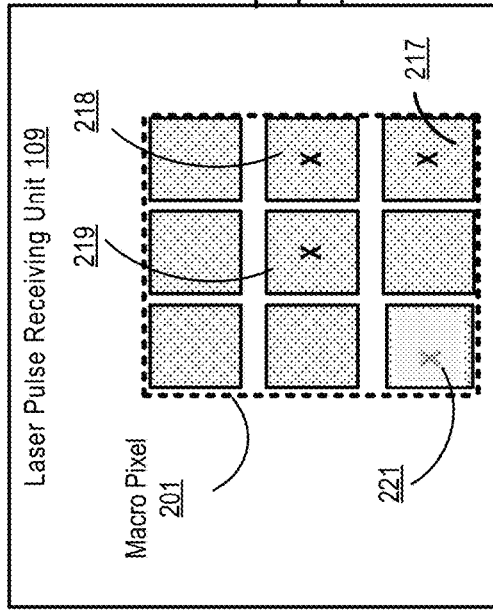
Figure 3B:
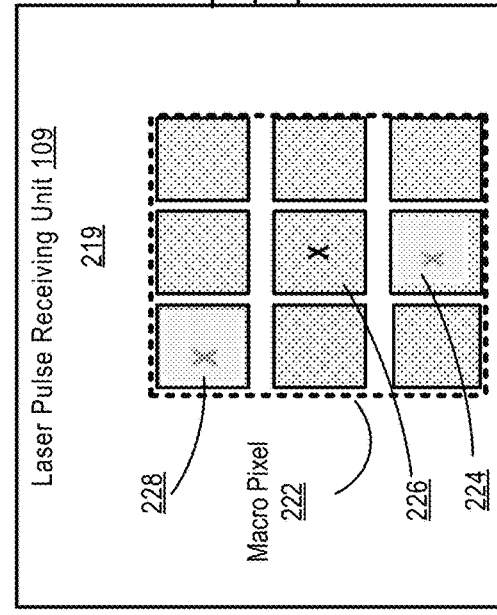

FIGS. 3A-3B illustrate examples of multi-level digital signals and an example of a threshold value in accordance with an embodiment.

FIG. 3A uses the macro-pixel 201 and adder 1 213 as an example. Adder 1 213 can be part of a circuit for signal processing or a separate circuit in the controlling unit 107. Adder 1 213 can count 4 photons 217-221 from reflected laser pulses from a particular scanning angle of the LiDAR device 101. The controlling unit 107 can control the laser pulse scanner 105 to scan at different angles at regular intervals of time, for example, every 600 nanoseconds. After a short delay (e.g., 100 nanoseconds) after each scan, photons from the scanning angle are expected to be incident on photodetector 117. Therefore, the controlling unit 107 can calculate when a particular column of macro-pixels is to receive reflected photons.

In this embodiment, the column 220 of macro-pixels containing the macro-pixel 201 is to receive reflected photons. The controlling unit 107 can turn on this column 220 of macro-pixels, and turn off all the other columns of macro-pixels 222, 224 and 226. Therefore, signal photons that the photodetector 117 is expected to receive are incident on the photodetector 117 in a temporal cluster—they arrive at approximately the same time, which means the larger the number of photons received on a macro-pixel, the more likely that the photons are signal photons.

As such, a threshold value can be used to determine which multi-level digital signal is a noise event, and which one is a signal event. For example, if a particular macro-pixel receives only one photon, it is likely that the photon is a random noise photon because signal photons are expected to be incident on the macro-pixel in a temporal cluster.

In one embodiment, a threshold value 317 of 3.5 can be applied to a multi-level digital signal 319 constructed by add A 213 from the 4 photons received on the macro-pixel 201. In this case, adder 1 213 can register the multi-level digital signal as a signal event because the number of levels of the multi-level digital signal is equal to or exceeds the threshold value of 3.5.

FIG. 3B uses the macro-pixel 222 and adder 2 215 as an example. As shown in FIG. 3B, a three-level digital signal 321 converted from photons incident on the macro-pixel 222 does not reach the threshold value 317, and therefore would be rejected by the controlling unit 107 as a noise event.

Figure 4:
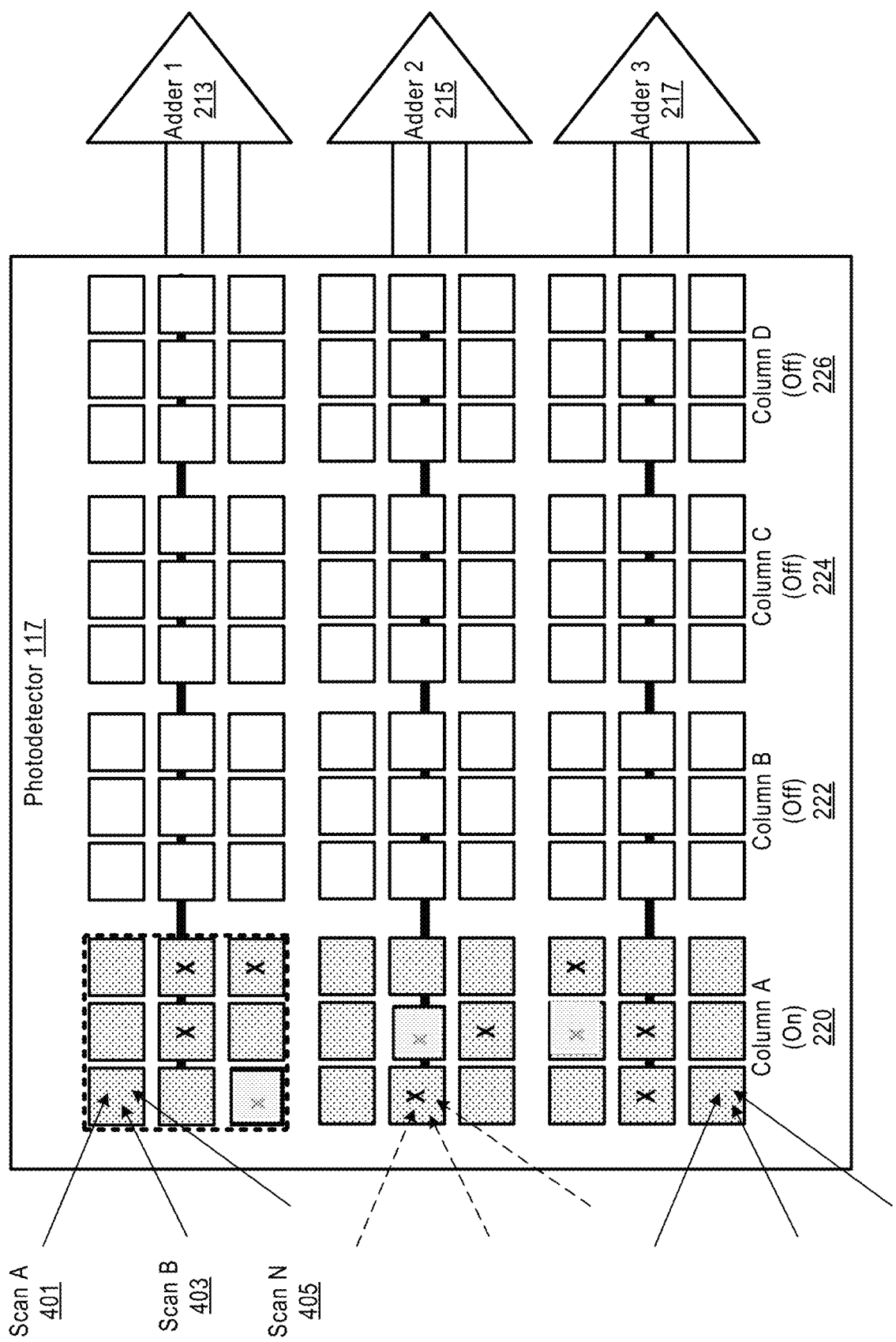
FIG. 4 illustrates further the system for suppressing ambient light in accordance with an embodiment.

FIG. 4 further illustrates the system for suppressing ambient light in accordance with an embodiment. More specifically, this figures describes features that can be used to compensate for the resolution loss due to the use of macro-pixels in the photodetector 117 and the potential discarding of signal photons as noise photons.

As described above, the photodetector 117 arranges the SPADS in macro-pixels, resulting in less pixels compared to photodetectors that register a pixel per SPAD. Further, the use of a threshold value may potentially cause some signal photons to be discarded. The above factors may reduce the resolution of a LiDAR image.

In one embodiment, as shown in FIG. 4, while column A 220 of macro-pixels is turned on to receive reflected signals, the controlling unit 107 can control the laser pulse scanner 105 to scan at slightly different angles 401, 403 and 405, and each scan may cause reflected photons from a same portion of a target object to be incident on column A 220.

For each scan, the controlling unit 107 can use the adders 213, 215, and 217 to construct a multi-level digital signal for each macro-pixel in column A 220, and determines to register or discard it based on the number of levels of that multi-level digital signal.

Each scan can result in additional information of the target object, and the signal photons from all the scans can be added together to improve the resolution of the LiDAR image.

In one embodiment, the different scans can be directed towards the same angle. In such case, the reflected laser pulses (reflected laser photons) from the different scans are incident on column A 220. Such multiple scans towards the same angle may also increase the resolution of the LiDAR image.

Figure 5:
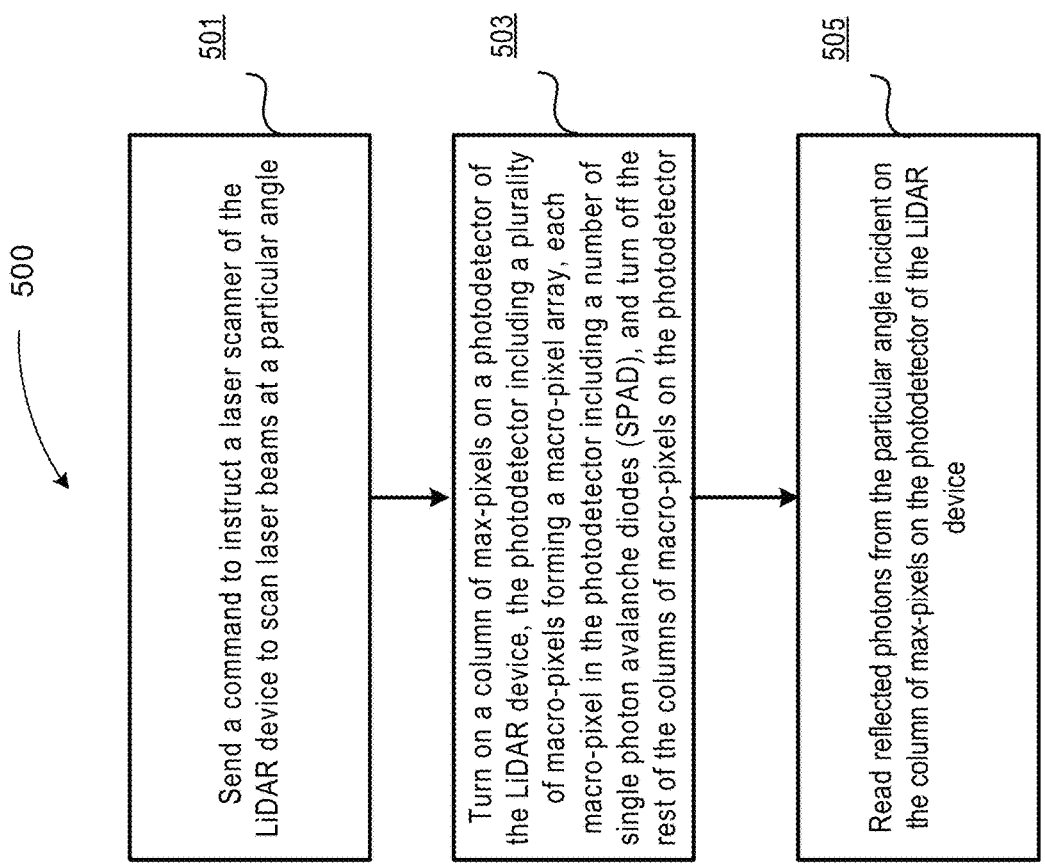
FIG. 5 is a process 500 illustrating a method of suppressing ambient light in a LiDAR device in accordance with an embodiment.

FIG. 5 is a process 500 illustrating a method of suppressing ambient light in a LiDAR device in accordance with an embodiment. Process 500 may be performed by processing logic which may include software, hardware, firmware, or a combination thereof. For example, process 500 may be performed by the controlling unit 107 described in FIG. 1.

As shown in FIG. 5, in operation 501, the processing logic sends a command to instruct a laser scanner of the LiDAR device to scan laser beams at a particular angle. In operation 503, the processing logic turns on a column of max-pixels on a photodetector of the LiDAR device, the photodetector including a plurality of macro-pixels forming a macro-pixel array, each macro-pixel in the photodetector including a number of single photon avalanche diodes (SPAD), and turns off the rest of the columns of macro-pixels on the photodetector. In operation 55, the processing logic reads reflected photons from the particular angle that are incident on the column of max-pixels on the photodetector of the LiDAR device.

Some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

All of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A system for suppressing ambient light in a light detection and ranging (LiDAR) device, comprising:
    a photodetector including a plurality of macro-pixels forming a macro-pixel array, each macro-pixel in the photodetector including a number of single photon avalanche diodes (SPAD);
    a laser scanner to scan laser beams at different directions;
    a controlling unit that configures the laser scanner to scan laser beams such that reflected laser photons are incident on the photodetector one column of macro-pixels at a time, the column of macro-pixels being turned on, and the rest of the macro-pixels on the photodetector being turned off; and
    a plurality of adders, each adder configured to add the output of each photodetectors within a macro-pixel to construct a multi-level digital signal.

2. The system of claim 1, wherein the multi-level digital signal is a staircase digital signal.

3. The system of claim 1, wherein the macro-pixel receives one or more signal photons and one or more noise photons.

4. The system of claim 3, wherein the controlling unit is further configured to register the multi-level digital signal based on a predetermined threshold.

5. The system of claim 1, wherein the laser scanner is configured to scan for a predetermined number of times, each time at a different angle, such that the turned-on column of macro-pixels receives reflected laser pulses of a same portion of a target object from the different angles.

6. The system of claim 1, wherein the laser scanner is configured to scan for a predetermined number of times, each time at a same angle, such that the turned-on column of macro-pixels receives reflected laser pulses of a same portion of a target object from the same angle.

7. The system of claim 1, wherein the laser beams are linear laser beams that are either diffused from laser spots by a diffuser in the LiDAR device, or directly generated by a laser pulse emitting unit in the LiDAR device.

8. A method of suppressing ambient light in a light detection and ranging (LiDAR) device, comprising:
    sending a command to instruct a laser scanner of the LiDAR device to scan laser beams at a particular angle;
    turning on a column of macro-pixels on a photodetector of the LiDAR device, the photodetector including a plurality of macro-pixels forming a macro-pixel array, each macro-pixel in the photodetector including a number of single photon avalanche diodes (SPAD), and turning off the rest of the columns of macro-pixels on the photodetector;

reading from macro-pixels on the turned-on column of the photodetector of the LiDAR device; and using outputs from each of the macro-pixels to construct a multi-level digital signal.

9. The method of claim 8, wherein the multi-level digital signal is a staircase digital signal.

10. The method of claim 8, wherein the macro-pixel receives one or more signal photons and one or more noise photons.

11. The method of claim 10, wherein the method further comprises: registering the multi-level digital signal based on a predetermined threshold.

12. The method of claim 8, wherein the laser scanner is configured to scan for a predetermined number of times, each time at a different angle, such that the turned-on column of macro-pixels receives reflected laser pulses of a same portion of a target object from the different angles.

13. The method of claim 8, wherein the laser scanner is configured to scan for a predetermined number of times, each time at a same angle, such that the turned-on column of macro-pixels receives reflected laser pulses of a same portion of a target object from the same angle.

14. The method of claim 8, wherein the laser beams are linear laser beams that are either diffused from laser spots by a diffuser in the LiDAR device, or directly generated by a laser pulse emitting unit in the LiDAR device.

15. An electronic circuit embedded in in a light detection and ranging (LiDAR) device, the digital circuit configured to perform operations comprising:

sending a command to instruct a laser scanner of the LiDAR device to scan laser beams at a particular angle;

turning on a column of macro-pixels on a photodetector of the LiDAR device, the photodetector including a plurality of macro-pixels forming a macro-pixel array, each macro-pixel in the photodetector including a number of single photon avalanche diodes (SPAD), and turning off the rest of the columns of macro-pixels on the photodetector;

reading from macro-pixels on the turned-on column of the photodetector of the LiDAR device; and using outputs from each of the macro-pixels to construct a multi-level digital signal.

16. The electronic circuit of claim 15, wherein the macro-pixel includes one or more signal photons and one or more noise photons.

17. The electronic circuit of claim 16, wherein the operations further comprises: registering the multi-level digital signal based on a predetermined threshold.

18. The electronic circuit of claim 15, wherein the laser scanner is configured to scan for a predetermined number of times, each time at a different angle, such that the turned-on column of macro-pixels receives reflected laser pulses of a same portion of a target object from the different angles.

19. The electronic circuit of claim 15, wherein the laser scanner is configured to scan for a predetermined number of times, each time at a same angle, such that the turned-on column of macro-pixels receives reflected laser pulses of a same portion of a target object from the same angle.

20. The electronic circuit of claim 15, wherein the laser beams are linear laser beams that are either diffused from laser spots by a diffuser in the LiDAR device, or directly generated by a laser pulse emitting unit in the LiDAR device.

* * * * *